(12) United States Patent
Foreman et al.

(10) Patent No.: US 7,870,525 B2
(45) Date of Patent: *Jan. 11, 2011

(54) SLACK SENSITIVITY TO PARAMETER VARIATION BASED TIMING ANALYSIS

(75) Inventors: Eric A. Foreman, Fairfax, VT (US);
Peter A. Habitz, Hinesburg, VT (US);
David J. Hathaway, Underhill, VT (US); Jerry D. Hayes, Milton, VT (US);
Jeffrey H. Oppold, Richmond, VT (US);
Anthony D. Polson, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 12/122,451

(22) Filed: May 16, 2008

(65) Prior Publication Data

US 2008/0216036 A1    Sep. 4, 2008

Related U.S. Application Data

(63) Continuation of application No. 10/904,309, filed on Nov. 3, 2004, now Pat. No. 7,401,307.

(51) Int. Cl.
*G06F 17/50* (2006.01)
(52) U.S. Cl. .............................................. 716/6; 716/1
(58) Field of Classification Search ...................... 716/1, 716/6
See application file for complete search history.

(56) References Cited

U.S. PATENT DOCUMENTS

| 4,924,430 A | 5/1990 | Zasio et al. |
| 5,544,071 A | 8/1996 | Keren et al. |
| 5,640,429 A | 6/1997 | Michels et al. |
| 5,694,342 A | 12/1997 | Stein |
| 6,397,371 B1 | 5/2002 | Balarin |

(Continued)

OTHER PUBLICATIONS

Chen, H.-C et al., "A Path Sensitization Approach to Area Reduction," Computer Design: VLSI in Computers and Processors, 1993. ICCD 1993 Proceedings, IEEE International Conference, Oct. 1993, pp. 73-76.

(Continued)

*Primary Examiner*—Paul Dinh
*Assistant Examiner*—Suchin Parihar
(74) *Attorney, Agent, or Firm*—Richard M. Kotulak; Hoffman Warnick LLC

(57) ABSTRACT

A method, system and program product are disclosed for improving an IC design that prioritize failure coefficients of slacks that lead to correction according to their probability of failure. With an identified set of independent parameters, a sensitivity analysis is performed on each parameter by noting the difference in timing, typically on endpoint slacks, when the parameter is varied. This step is repeated for every independent parameter. A failure coefficient is then calculated from the reference slack and the sensitivity of slack for each of the timing endpoints and a determination is made as to whether at least one timing endpoint fails a threshold test. Failing timing endpoints are then prioritized for modification according to their failure coefficients. The total number of runs required is one run that is used as a reference run, plus one additional run for each parameter.

20 Claims, 5 Drawing Sheets

U.S. PATENT DOCUMENTS

| | | |
|---|---|---|
| 6,425,110 B1 | 7/2002 | Hathaway et al. |
| 6,487,705 B1 * | 11/2002 | Roethig et al. ............... 716/6 |
| 6,507,938 B1 | 1/2003 | Roy-Neogi et al. |
| 6,637,014 B2 | 10/2003 | Casavant |
| 6,701,505 B1 | 3/2004 | Srinivasan |
| 6,708,139 B2 | 3/2004 | Rearick et al. |
| 7,213,223 B2 * | 5/2007 | Tetelbaum ............... 716/6 |
| 7,263,150 B2 | 8/2007 | Ishida et al. |
| 7,401,307 B2 * | 7/2008 | Foreman et al. ............. 716/6 |
| 2002/0116685 A1 * | 8/2002 | van Ginneken ............. 716/1 |
| 2003/0192020 A1 | 10/2003 | Collins, Jr. |
| 2003/0226122 A1 | 12/2003 | Hathaway et al. |
| 2003/0229871 A1 | 12/2003 | Nakae et al. |
| 2004/0199884 A1 | 10/2004 | Brittain et al. |
| 2004/0243964 A1 | 12/2004 | McElvain et al. |
| 2005/0246116 A1 | 11/2005 | Foreman et al. |
| 2005/0246117 A1 | 11/2005 | Hathaway et al. |
| 2005/0283748 A1 | 12/2005 | Iguchi |
| 2006/0010415 A1 | 1/2006 | Curtin et al. |
| 2006/0015836 A1 | 1/2006 | Curtin et al. |
| 2006/0048084 A1 | 3/2006 | Barney et al. |
| 2006/0085775 A1 | 4/2006 | Chang et al. |
| 2006/0122158 A1 * | 6/2006 | Bunschoten et al. ........ 514/170 |
| 2006/0195807 A1 | 8/2006 | Foreman et al. |
| 2007/0016881 A1 | 1/2007 | Gregory et al. |
| 2007/0019887 A1 | 1/2007 | Nestares et al. |
| 2007/0089074 A1 | 4/2007 | Ramachandran et al. |
| 2007/0220345 A1 | 9/2007 | Hathaway et al. |
| 2008/0066036 A1 | 3/2008 | Curtin et al. |
| 2008/0072198 A1 * | 3/2008 | Celik et al. ............... 716/6 |

OTHER PUBLICATIONS

"Timing Verification Algorithm for Clock Design with Slack Stealing," IBM Technical Disclosure Bulletin, vol. 36, No. 10, Oct. 1993, pp. 249-253.

Agarwal, A. et al., "Statistical Timing Analysis for Intra-Die Process Variations with Spatial Correlations," ICCAD, Nov. 2003, pp. 900-907.

Chang, H. et al., "Statistical Timing Analysis Considering Spatial Correlations Using a Single Pert-Like Traversal," ICCAD, Nov. 2003, pp. 621-625.

U.S. Appl. No. 11/930,924, Office Action dated Jun. 12, 2009.

U.S. Appl. No. 11/930,924, filed Oct. 31, 2007, Notice of Allowance and Fees Due dated Nov. 27, 2009.

* cited by examiner

SLACK SENSITIVITY TO PARAMETER VARIATION BASED TIMING ANALYSIS

CROSS REFERENCE TO RELATED APPLICATIONS

The current application is a continuation application of U.S. patent application Ser. No. 10/904,309, filed on Nov. 3, 2004 now U.S. Pat. No. 7,401,307, which is hereby incorporated by reference.

BACKGROUND OF THE INVENTION

1. Technical Field

The present invention relates generally to integrated circuit design, and more particularly, to a method, system and program product for improving IC design performance by analyzing IC timing based on a slack sensitivity to variations in parameters that affect timing.

2. Related Art

A wide variety of methods are employed in the optimization of integrated circuit designs. One of these methods includes evaluation of the static timing of parts of the circuit. Methodologies used today for static timing analysis are based on different parameters that affect timing. The parameter values used are typically based on nominal values of parameters or on extreme values of the range of values for a parameter, for example, a minimum and maximum value corresponding to +/−3 standard deviation units. In order to evaluate the impact that a given parameter will have on timing, a timing run is performed with the parameter set to a minimum value, and then another timing run is performed with the parameter set to a maximum value.

As technology offerings become richer in terms of increased features (e.g., the number of devices offered, increased metal layers or increased number of voltage islands), the number of parameters that affect timing grows accordingly. For example, the number of parameters can easily exceed 10 or more in today's technologies. Unfortunately, conventional techniques to evaluate timing over all parameters, requires 2N timing runs, where N represents the number of parameters. Each of the $2^N$ timing runs uses a different combination of minimum and maximum settings for different parameters. Any one combination is referred to herein as a "parameter/process permutation." Where the number of parameters exceeds 10, timing analysis can require more than 1000 timing runs for a complete evaluation, which is extremely time and resource consuming.

In addition to the above problem, conventional timing analysis approaches also do not satisfactorily address timing errors because they typically focus exclusively on timing endpoint (latch) slack, i.e., the difference between a timing requirement and an actual timing caused by the circuit. FIG. 1 shows one illustrative conventional approach. In this approach, in step S1, a timing run is conducted using a single parameter/process permutation to determine endpoint slacks. These slacks are not necessarily bounding (i.e., extreme values) since other choices for parameter/process permutations could easily lead to more conservative slacks. As a result, the conventional approach may yield circuit timing analysis results that fail to detect potential timing errors and lead to non-zero failure probabilities.

In step S2, these non-bounding slacks are then compared to a slack threshold. Slacks less than slack threshold S(threshold), where S(threshold) is typically chosen as zero, are considered failures that require correction. Unfortunately, timing endpoints with the largest negative slacks may not represent the most critical slacks in terms of maximizing product yield because their sensitivities to parameter variations may result in a smaller probability of failure as compared to other timing endpoints. In other words, using a single parameter/process permutation does not adequately address the sensitivities to parameter variations that may lead to failure. In addition, the conventional approach provides no insight relative to parameter non-tracking sensitivities, i.e., situations where two or more parameters that are normally expected to vary together in a particular manner do not vary together. Therefore, using slack values to prioritize timing endpoints for correction can lead to poor utilization of resources.

In step S3, the failing endpoints and corresponding slack values are targeted for correction. Since only the slack value from a timing analysis at a single parameter/process permutation is available to guide correction, the correction cannot improve design robustness against parameter variations or maximize chip performance under all variations. After correction, the conventional methodology returns to step S1 for validation.

In view of the foregoing, there is a need in the art for a way to address the problems of the related art.

SUMMARY OF THE INVENTION

The invention includes a method, system and program product for improving an IC design that prioritize failure coefficients of slacks that lead to correction according to their probability of failure. With an identified set of independent parameters, a sensitivity analysis is performed on each parameter by noting the difference in timing, typically on endpoint slacks, when the parameter is varied. This step is repeated for every independent parameter. A failure coefficient is then calculated from the reference slack and the sensitivity of slack for each of the timing endpoints and a determination is made as to whether at least one timing endpoint fails a threshold test. Failing timing endpoints are then prioritized for modification according to their failure coefficients. The total number of runs required is one run that is used as a reference run, plus one additional run for each parameter.

A first aspect of the invention is directed to a method of improving a probability of an integrated circuit (IC) design meeting timing requirements, the method comprising the steps of: a) determining a reference slack and a sensitivity of slack to a variation in at least one parameter for each of a plurality of timing endpoints of the design; b) calculating a failure coefficient from the reference slack and the sensitivity of slack for each of the timing endpoints; c) determining whether each timing endpoint fails a threshold test; d) prioritizing any timing endpoints that fail the threshold test according to respective failure coefficients; and e) modifying the design to improve a slack of at least one of the timing endpoints.

A second aspect of the invention is directed to a system for improving a probability of an integrated circuit (IC) design meeting timing requirements, the system comprising: a) means for determining a reference slack and a sensitivity of slack to a variation in at least one parameter for each of a plurality of timing endpoints of the design; b) means for calculating a failure coefficient from the reference slack and the sensitivity of slack for each of the timing endpoints; c) means for determining whether each timing endpoint fails a threshold test; d) means for prioritizing any timing endpoints that fail the threshold test according to respective failure coefficients; and e) means for modifying the design to improve a slack of at least one of the timing endpoints.

A third aspect of the invention is directed to a computer program product comprising a computer useable medium having computer readable program code embodied therein for improving a probability of an integrated circuit (IC) design meeting timing requirements, the program product comprising: a) program code configured to determine a reference slack and a sensitivity of slack to a variation in at least one parameter for each of a plurality of timing endpoints of the design; b) program code configured to calculate a failure coefficient from the reference slack and the sensitivity of slack for each of the timing endpoints; c) program code configured to determine whether each timing endpoint fails a threshold test; d) program code configured to prioritize any timing endpoints that fail the threshold test according to respective failure coefficients; and e) program code configured to modify the design to improve a slack of at least one of the timing endpoints.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For purposes of clarity only, the description includes the following sub-titles: I. System Overview, II. Operational Methodology, and III. Conclusion.

I. System Overview

Figure 1:
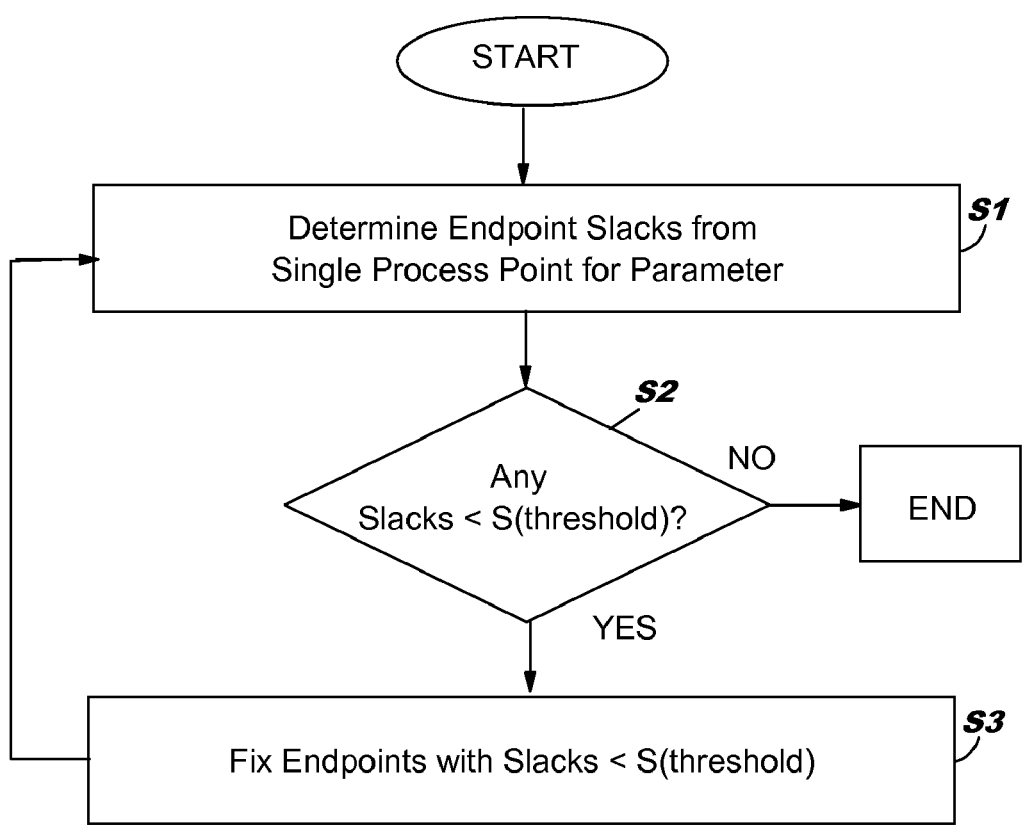
FIG. 1 shows a conventional approach to timing analysis.
Figure 2:
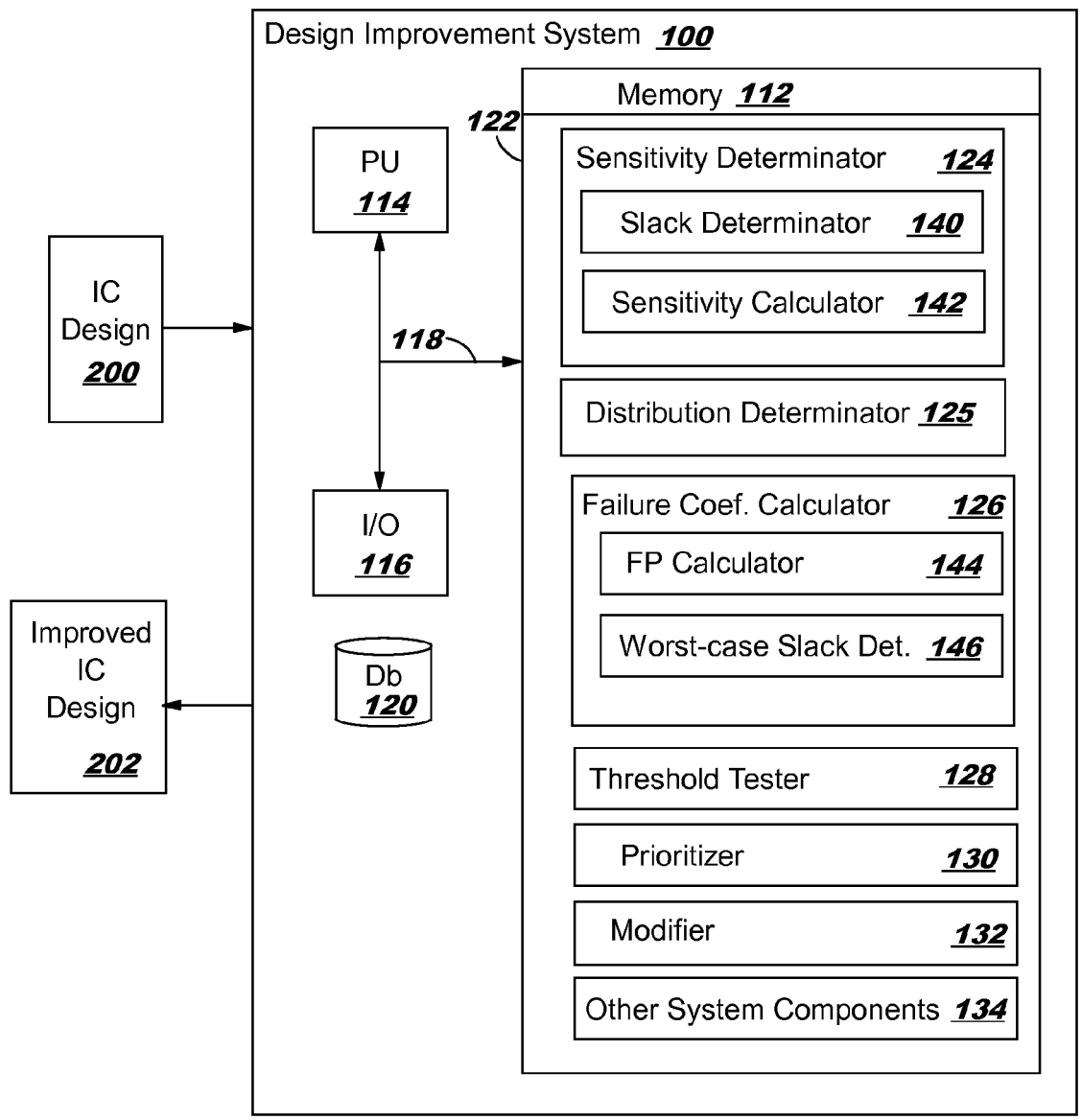
FIG. 2 shows a block diagram of an IC design improvement system according to one embodiment of the invention.

With reference to the accompanying drawings, FIG. 2 is a block diagram of an integrated circuit (IC) design improvement system 100 according to one embodiment of the invention. System 100 includes a memory 112, a processing unit (PU) 114, input/output devices (I/O) 116 and a bus 118. A database 120 may also be provided for storage of data relative to processing tasks. Memory 112 includes a program product 122 that, when executed by PU 114, comprises various functional capabilities described in further detail below. Memory 112 (and database 120) may comprise any known type of data storage system and/or transmission media, including magnetic media, optical media, random access memory (RAM), read only memory (ROM), a data object, etc. Moreover, memory 112 (and database 120) may reside at a single physical location comprising one or more types of data storage, or be distributed across a plurality of physical systems. PU 114 may likewise comprise a single processing unit, or a plurality of processing units distributed across one or more locations. I/O 116 may comprise any known type of input/output device including a network system, modem, keyboard, mouse, scanner, voice recognition system, CRT, printer, disc drives, etc. Additional components, such as cache memory, communication systems, system software, etc., may also be incorporated into system 100. System 100 receives an IC design 200 to be legalized and outputs an improved IC design 202. It should be recognized that system 100 may be incorporated as a part of a larger IC design system or be provided as a separate system.

As shown in FIG. 2, program product 122 may include a sensitivity determinator 124, a distribution determinator 125, a failure coefficient calculator 126, a threshold tester 128, a prioritizer 130, a modifier 132, and other system components 134. Sensitivity determinator 124 may include a slack determinator 140 and a sensitivity calculator 142. Failure coefficient calculator 126 may include a failure probability (FP) calculator 144 and a worst-case slack determinator 146. Other system components 134 may include any other necessary functionality not expressly described herein.

It should be recognized that while system 100 has been illustrated as a standalone system, it may be included as part of a larger IC design system or a peripheral thereto. An IC design 200 is input to system 100, and an improved IC design 202 is output from system 100.

II. Operational Methodology

Figure 3:
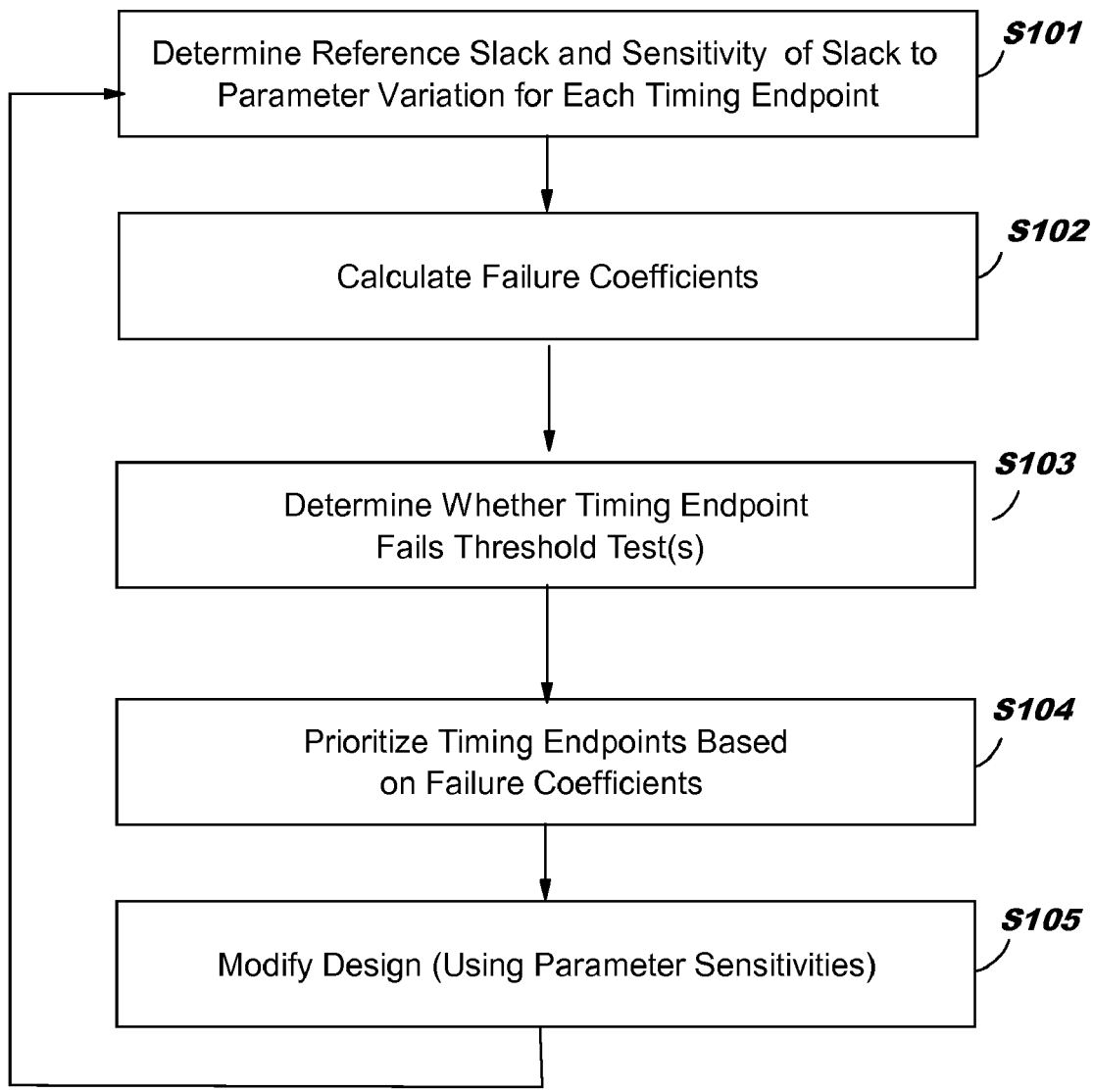
FIG. 3 shows a flow diagram of operational methodology of the system of FIG. 2 according to one embodiment of the invention.

Turning to FIG. 3 in conjunction with FIG. 2, an operational methodology of system 100 for improving a probability of an integrated circuit (IC) design meeting timing requirements according to one embodiment of the invention will now be described. As a brief overview, the method includes the following steps: S101, determine a reference slack and a sensitivity of slack to a variation in at least one parameter for each of a plurality of timing endpoints of the design; S102, calculate a failure coefficient from the reference slack and the sensitivity of slack for each of the timing endpoints; S103, determine whether at least one timing endpoint has greater than a specified probability of failing at least one threshold test; S104, prioritize any timing endpoints that fail the at least one threshold test according to their respective failure coefficients; and S105, modify the design to improve a slack of at least one of the timing endpoints.

Turning to the details of the method, in first step S101, a reference slack and a sensitivity of slack to a variation in at least one parameter for each of a plurality of timing endpoints of the design are determined by sensitivity determinator 124. As used herein, a "parameter" can be one or more factors that can be varied to change the timing of IC design 200. For example, a parameter may be a voltage, a structural (metal) dimension, material, a process step, etc., or a combination of the above. With regard to the reference slack determination, slack determinator 140 may include any now known or later developed software, along with hardware, necessary to obtain a slack value for a timing endpoint of IC design 200 (FIG. 2).

Figure 4:
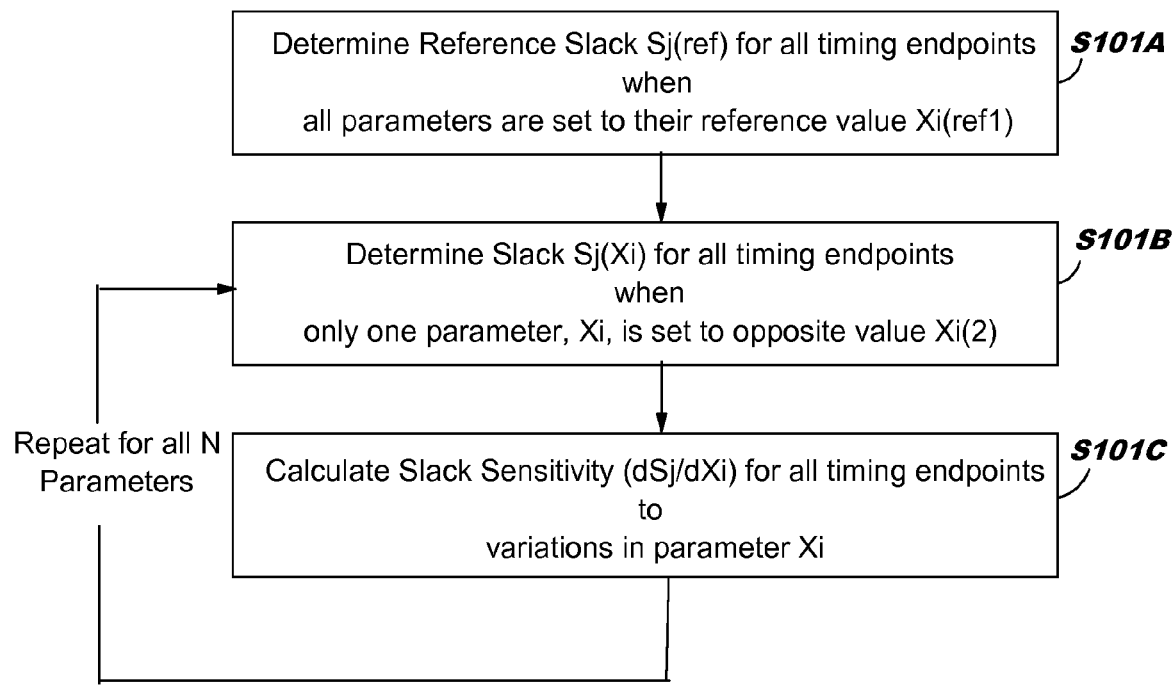
FIG. 4 shows a flow diagram of processing by a sensitivity determinator of FIG. 2.

Referring to FIG. 4, a flow diagram of operational methodology of sensitivity calculator 142 according to one embodiment of the invention is shown. In this embodiment, in a first sub-step S101A, a first reference slack $S_j(ref1)$ is determined by sensitivity determinator 124 for each timing endpoint by using reference values for all parameters, where j ranges between 1 and the total number of endpoints of interest denoted as M. Each reference slack $S_j(ref1)$ is calculated when all N independent parameters $X_i$, where i ranges between 1 and N, are set to their corresponding reference parameter value $X_i(ref1)$. Each reference parameter value $X_i(ref1)$ may be equivalent to, for example, an extreme value from the range (distribution) of the parameter, a nominal value $X_i(nom)$, or some other value. In a second sub-step S101B, sensitivity calculator 142 determines a second slack $S_j(X_i)$ for all M timing endpoints of interest when one parameter, Xi, is substantially equivalent to a new, different parameter value Xi(2). In one embodiment, the different parameter value Xi(2) may be a value corresponding to an opposite, second extreme value from the range (distribution) of the parameter that was chosen for the reference parameter value during the reference slack calculation step S101A. During this step, only parameter Xi is changed while all other N−1 parameter values remain set to the values used in sub-step S101A. In one embodiment, the value for a reference parameter used during sub-step S101A is $Xi(nom)+Ki*\sigma i$ and the value used for the different parameter value during sub-step S101B is $Xi(nom)-Ki*\sigma i$, where Xi(nom) is the mean, $\sigma i$ is the standard deviation, and Ki is the standard deviation multiplier of the Xi parameter distribution. Typically, a value of 3 is chosen for Ki to represent +/−3 standard deviations from the mean, however, other values may be used. In sub-step S101C, sensitivity calculator 142 calculates the slack sensitivity ($\partial Sj/\partial Xi$) to parameter Xi variations for all M timing endpoints of interest. In one embodiment, the slack sensitivity for a given timing endpoint is calculated by dividing the difference in slack $\partial Sj$ (i.e., $Sj(ref1)-Sj(Xi)$) by the difference in the parameter's value $\partial Xi$ (i.e., $Xi(ref1)-Xi(2)$) in order to obtain $\partial Sj/\partial Xi$, however other methods of calculating sensitivity of slack to parameter variation may be used. It should be recognized that the two slack computations (step S101A and S101B) used to determine each slack sensitivity $\partial Sj/\partial Xi$ (step S101C) may give different results due to different paths to endpoint j. Thus, they are not simply delay derivatives, but include effects due to the dominance of different paths under different parameter/process permutations. Once the slack sensitivities for all M timing endpoints are calculated for parameter Xi, steps S101B and S101C are repeated for each of the remaining N−1 parameters.

Returning to FIG. 3, the second step S102 includes failure coefficient calculator 144 calculating a failure coefficient (FP) from the reference slack Sj(ref1) and parameter sensitivities, i.e., $\partial Sj/dX1$ to $\partial Sj/dXN$, for each of the timing endpoints. As used herein, a "failure coefficient" is a value indicative of a probability of failure for a timing endpoint, and can be embodied in a number of ways including actual numerical calculations of a failure probability and a worst case excess slack, as will be described below. In step S103, a determination is made by threshold tester 128 as to whether each timing endpoint fails a threshold test. As will become clear below, the failure coefficient calculated and the threshold test evaluated, and the order of step S102 and S103, depends on what data is available based on the parameter distributions obtained as part of step S101.

Figure 5:
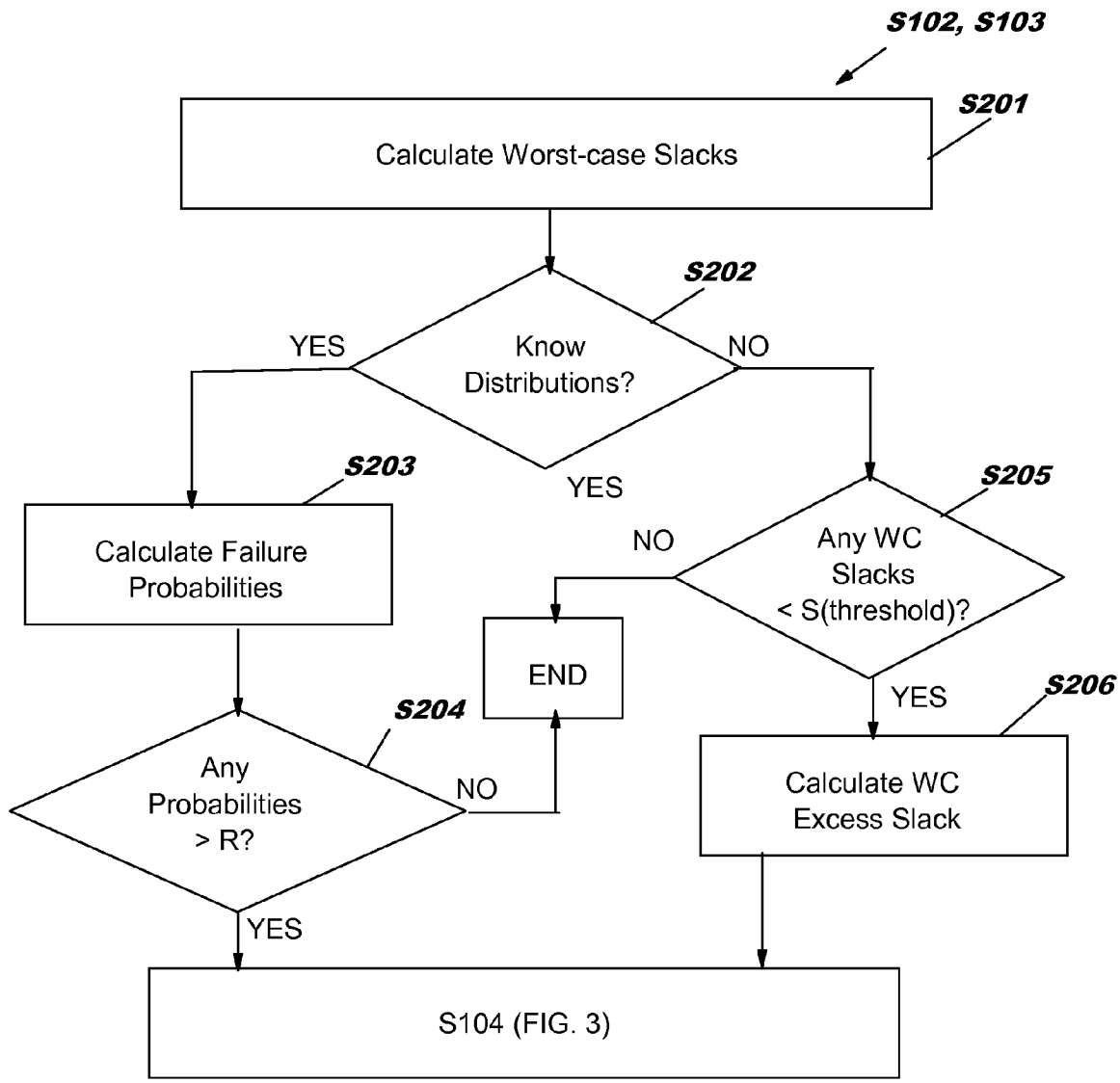
FIG. 5 shows a flow diagram of processing by a failure coefficient calculator and a threshold tester of FIG. 2.

Turning to FIG. 5, details of steps S102 and S103 will now be described.

In a first sub-step S201, a worst-case (WC) slack determinator 146 calculates worst case (minimum or least positive) slack using the endpoint's reference slack Sj(ref1) and parameter sensitivities $\partial Sj/dX1$ to $\partial Sj/dXN$. In one embodiment, a worst case (minimal) slack value as computed by WC slack determinator 146 as: $S(Y\sigma) = Sj(nom)-Y*Sum$ over all N parameters of ABS $\{\partial Sj/\partial Xi*\sigma i\}$, where ABS is the absolute value and Y is a user definable multiple. The nominal slack for the slack distribution can be calculated as: $Sj(nom) = Sj(ref1)-sum$ over all N parameters $\{\partial Sj/\partial Xi*Ki*\sigma i\}$, where $Ki*\sigma i$ is the difference between values Xi(nom) and Xi(ref) of parameter i. The worst case slack $S(Y\sigma)$ is computed as the difference between nominal slack and a multiple (Y) of a sum over all parameters of an absolute value of standard deviation of the delay variation with respect to that parameter. In an alternative embodiment, the worst-case slack for each timing endpoint can be calculated as a difference between a nominal slack and a multiple (Y) of a root sum square over all parameters of an absolute value of standard deviation.

Next in sub-step S202, a determination is made as to whether all parameter distributions are defined in such a way that a failure probability can be determined (step S205) by distribution determinator 125. This determination may include determining whether the distributions are Gaussian or can be readily modeled as Gaussian. If YES at sub-step S202, then processing proceeds to sub-steps S203-S204, otherwise, processing proceeds to sub-steps S205-S206.

1. Sub-Steps S203-S204: Parameter Distributions Known: Gaussian or Modeled as Guassian If all parameter distributions are Gaussian or modeled as Gaussian, a failure coefficient can be calculated as a failure probability by FP calculator at sub-step S203 in one of three ways:

First, the failure coefficient can be calculated as a failure probability by FP calculator 144 based on a user-specified multiple (Y) of a standard deviation (sigma or $\sigma$) of the slack distribution, i.e., the +/−Y sigma points of the slack distribution. This step may be completed by first determining the nominal slack for the slack distribution as: $Sj(nom)=Sj(ref1)-sum$ over all N parameters $\{\partial Sj/\partial Xi*Ki*\sigma i\}$, where $Ki*\sigma i$ is the difference between values Xi(nom) and Xi(ref) of parameter i. The failure coefficient $S(Y\sigma)$ can then be computed by determining an endpoint slack at a specified Y sigma multiplier as: $S(Y\sigma)=Sj(nom)-Y*RSS$ over all N parameters $\{\partial Sj/\partial Xi*\sigma i\}$, where RSS is the root sum square. Typically, Y will be 3, but other sigma multipliers could be used.

Second, the failure probability can be calculated by FP calculator 144 by determining a sigma multiplier Z that would result in the slack of that endpoint equaling a specified slack threshold S(threshold). Specifically, Z would be computed as: $Z=(Sj(nom)-S(threshold))/(RSS$ over all N parameters $\{\partial Sj/\partial Xi*\sigma i\})$, where RSS is the root sum square. Sj(nom) would be calculated as described above. A larger value of Z would indicate a larger probability of failure.

Third, a failure probability could be calculated by FP calculator 144 by integrating the slack probability distribution from minus infinity (−∞) to $Sj(nom)-Z*RSS$ over all N parameters $\{\partial Sj/\partial Xi*\sigma i\}$ using an error function of a Gaussian density (i.e., an erf function). the sigma multiplier Z would be calculated as described above.

Once the failure probability is known, at sub-step S205, a determination is made by threshold tester 128 as to whether a failure probability of any timing endpoint exceeds a failure coefficient threshold R. In general, a failure coefficient threshold R may be selected by a user to balance performance for risk of loss of product yield. If NO at sub-step S205, then no IC design modification is necessary and processing ends. Otherwise, i.e., YES at sub-step S205, processing returns to step S104 of FIG. 3.

2. Sub-Steps S205-S206: Parameter Distributions Undefined

If the distributions are undefined, i.e., NO at sub-step S202, in sub-step S205, a determination is made by threshold tester 128 as to whether a worst-case WC slack $S(Y\sigma)$ (computed for each timing endpoint by worst case slack determinator 146 (sub-step S201)) of any timing endpoint is less positive than a slack threshold S(threshold). For typical timing applications, slack threshold is usually zero, but this is not necessary. If any worst-case slack $S(Y\sigma)$ is more positive than slack threshold S(threshold), i.e., NO at sub-step S205, the probability of failure is considered to be zero and no IC design modification is necessary, so processing ends. That is, timing endpoints having a worst-case WC slack $S(Y\sigma)$ value greater than some user-specified threshold S(threshold) (typically zero) are considered to have a zero failure probability and thus need no improvement. If any worst-case slack S(Yσ) is more negative than slack threshold S(threshold), i.e., YES at sub-step S205, the probability of failure is non-zero and processing proceeds to sub-step S206. Among timing endpoints with worst case WC slack S(Yσ) values greater than S(threshold), those with lower (e.g., more negative) values are considered to have higher failure probabilities and thus have a higher priority for improvement.

In sub-step S206, the worst case (WC) slack values S(Yσ) computed for each timing endpoint by worst case slack determinator 146 (sub-step S201) are used by failure coefficient calculator 126 to generate a failure coefficient in the form of a worst case slack excess, which equals S(threshold)−S(Yσ). That is, the probability of failure for a timing endpoint can be derived from the worst case (minimum or least positive) slack value.

With regard to sub-steps S203 and S206, it should be recognized that the types of thresholds can vary depending on how the failure coefficient is calculated. In particular, since Z (the sigma multiple at which the slack becomes less than a slack threshold), S(Yσ) (the slack at a particular sigma multiple—computed by either RSS or summing the individual parameter sigma contributions) and an actual failure probability (computed by integrating a Gaussian distribution), are different numbers with different dimensions and ranges, the thresholds against which each should be compared may be different. For example, in the event that a sigma multiplier Z (at which a specified slack threshold S(threshold) is reached) is used as a failure coefficient, S(threshold) will be a sigma multiplier against which Z is compared. Accordingly, the failure coefficient used may be user selected, and an appropriate failure coefficient threshold used.

The results from sub-steps S203 or S206 are failure coefficients for each of the M timing endpoints. With further regard to sub-steps S203 and S206, it is also possible to introduce multiple pairs of slack thresholds S(threshold_i) and failure coefficient thresholds Ri, so that system 100 could analyze using stepped slack thresholds S(threshold_i) and failure coefficient thresholds Ri. In this fashion, modification requirement decisions can be made based on the various points of the slack distribution, rather than on just a single point.

Returning to FIG. 3, in fourth step S104, any timing endpoints that fail at least one threshold test are prioritized by prioritizer 130 according to their respective failure coefficients, i.e., failure probability or worst case slack excess. In one embodiment, the timing endpoints are prioritized from a highest failure coefficient (i.e., those most likely requiring modification) to a lowest failure coefficient (i.e., those less likely to require modification). For example, a higher priority would be assigned to endpoints with higher WC slack excesses S(threshold)−S(Yσ), lower computed Z sigma multipliers at which a specified slack threshold is reached, or at higher actual computed failure probabilities. Where multiple pairs of slack/failure coefficient thresholds (S(threshold_i)/Ri) are used, the prioritization may also be based on the multiplicity of threshold testing pairs. For example, system 100 may choose to modify all timing endpoints whose WC slack is less than slack threshold S(threshold_0) with a failure coefficient greater than R0, and then modify remaining timing endpoints whose WC slack is less than slack threshold X S(threshold_1) with a failure coefficient greater than R1, and so on. The prioritization may also include an estimation of the cost to implement a modification, e.g., increase in area, power, wiring required, etc., and implement modifications first for timing endpoints where the ratio between the failure coefficient and the cost of the modification is a maximum.

Next in step S105, the design is modified by modifier 132 to improve the slack of at least one of the timing endpoints. An improved IC design 202 is output. Modifier 132 may include any now known or later developed software mechanisms for correcting IC design 200 to address the timing issues. Where the prioritization is from highest to lowest failure coefficient, the modifying step includes modifying the design by addressing the timing endpoints from a failure coefficient indicative of a highest probability of failure to a failure coefficient indicative of a lowest probability of failure. Timing margin is traditionally added to the endpoint by padding either the early or late path delay that converges at the endpoint. Modifier 132 may also make modifications using parameter sensitivity for a respective timing endpoint by providing a sufficient timing margin for a respective timing endpoint in order to account for sensitivities to parameter variations. In addition, a high value for $\partial Sj/\partial Xi$ indicates that timing endpoint Sj has a high sensitivity to variations in parameter Xi. This implies a large imbalance of parameter Xi between the early and late timing paths. To correct for this imbalance, the sensitivity to parameter variations for a respective endpoint are used to guide parameter balancing and connectivity between paths that compose a timing test at the timing endpoint. That is, the layout between late and early paths are balanced or matched with similar parameter content and connectivity. For example, if a late path is routed primarily on metal layer C and the early path is routed primary on metal layer D, the timing endpoint associated with these paths will exhibit sensitivity to both metal layers C and D. The magnitude of the sensitivity is proportional to the amount of wire in each path. To reduce this sensitivity, one approach is to balance the metal layer content and connectivity between the early and lath paths in order to facilitate path delay tracking, thereby reducing slack sensitivity to metal C and metal D variations. Once modifications are made to the design to correct for timing violations, either by delay padding or by parameter-connectivity matching between the early and late paths, the process is repeated by returning to step S101 in FIG. 3. If all modifications in step S105 were successful, the new failure coefficients for each timing endpoint calculated from substeps S203 (FIG. 5) and S206 (FIG. 5) will terminate the process. If additional fixes are required, the processing flow of FIG. 5 is repeated.

III. Conclusion

The above-described invention provides a way, based on the known sensitivities, to provide a number of advantageous functions. For example, when parameters are independent from each other the invention allows one to determine what point within the $2^N$ parameter space corresponds to the most conservative physical space. This allows one to quickly identify the process space for timing closure on each endpoint without doing $2^N$ timing runs. In addition, the invention allows using the sensitivities to calculate a slack adjustment on the reference timing run that would correspond to the slack that would be obtained at the most conservative physical process space. The sensitivities can also be used to guide modification methodologies. Parameters with the highest sensitivities illustrate an unbalanced content of parameter usage between the early and late paths, which can be used to direct correction. The probability of endpoint failures can be used to prioritize timing endpoints for modification or help guide hardware functional test on which endpoints to test.

In the previous discussion, it will be understood that the method steps discussed are performed by a processor, such as PU 114 of system 100, executing instructions of program product 122 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. A system for improving a probability of an integrated circuit (IC) design meeting timing requirements, the system comprising:
   a) means for determining a reference slack using a reference run, and determining a sensitivity of slack to a variation in at least one parameter for each of a plurality of timing endpoints of the design;
   b) means for calculating a failure coefficient from the reference slack and the sensitivity of slack for each of the timing endpoints;
   wherein the failure coefficient calculating means and the threshold test determining means include means for:
   calculating a worst case slack for each timing endpoint, wherein the worst case slack calculating means calculates the worst case slack by one of:
       determining a difference between a nominal slack and a multiple (Y) of a sum over all parameters of an absolute value of standard deviation, and
       determining a difference between a nominal slack and a multiple (Y) of a root sum square over all parameters of an absolute value of standard deviation, and
   determining whether a parameter distribution is Gaussian or non-Gaussian;
   c) means for determining whether each timing endpoint fails a threshold test;
   d) means for prioritizing any timing endpoints that fail the threshold test according to respective failure coefficients; and
   e) means for modifying the design to improve a slack of at least one of the timing endpoints.

2. The system of claim 1, wherein the sensitivity determining means includes means for:
   determining a first slack at each timing endpoint for a reference parameter value for each parameter;
   determining a second slack at each timing endpoint for a different parameter value than the reference parameter value for each parameter; and
   calculating the sensitivity of the slack to the variation in the at least one parameter.

3. The system of claim 2, wherein the reference parameter value is substantially equivalent to one of:
   a first extreme value of a value range of the parameter; and
   a nominal value plus a multiple of a standard deviation of the parameter.

4. The system of claim 2, wherein in the case that the first extreme value is used, the different parameter value is substantially equivalent to an opposite, second extreme value of the value range of the parameter.

5. The system of claim 2, wherein the sensitivity calculating means includes means for dividing a difference between the first slack and the second slack by a difference between the reference parameter value and the different parameter value.

6. The system of claim 1, wherein in the case that the parameter distribution is Gaussian, the failure coefficient calculating means calculates the failure coefficient for each timing endpoint by one of:
   a) integrating a slack distribution from minus infinity to a failure threshold;
   b) determining a sigma multiplier at which an endpoint slack equals a slack threshold; and
   c) calculating a multiple of a standard deviation of a slack distribution; and the threshold test includes the failure probability exceeding a failure probability threshold.

7. The system of claim 1, wherein in the case that the parameter distribution is non-Gaussian, the threshold test includes the worst-case slack of any timing endpoint exceeding a slack threshold, and
   the failure coefficient calculating means calculates a worst case slack excess for any timing endpoint exceeding the slack threshold.

8. The system of claim 1, wherein the modifying means modifies the design by addressing the timing endpoints from a failure coefficient indicative of a highest probability of failure to a failure coefficient indicative of a lowest probability of failure.

9. The system of claim 1, wherein the modifying means uses the sensitivity to parameter variations for a respective timing endpoint to guide parameter balancing and connectivity between paths that compose a timing test at the timing endpoint.

10. The system of claim 1, wherein the modifying means provides a sufficient timing margin for a respective timing endpoint in order to account for sensitivities to parameter variations.

11. A computer program product comprising a non-transitory computer useable medium having computer readable program code embodied therein for improving a probability of an integrated circuit (IC) design meeting timing requirements, the program product comprising:
   a) program code configured to determine a reference slack using a reference run, and determine a sensitivity of slack to a variation in at least one parameter for each of a plurality of timing endpoints of the design;
   b) program code configured to calculate a failure coefficient from the reference slack and the sensitivity of slack for each of the timing endpoints, wherein the failure coefficient calculating code and the threshold test determining code include program code configured to:
 calculate a worst case slack for each timing endpoint, and determine
 whether a parameter distribution is Gaussian or non-Gaussian,
  wherein in the case that the parameter distribution is Gaussian, the failure coefficient calculating code calculates the failure coefficient for each timing endpoint by one of:
   a) integrating a slack distribution from minus infinity to a failure threshold,
   b) determining a sigma multiplier at which an endpoint slack equals a slack threshold, and
   c) calculating a multiple of a standard deviation of a slack distribution,
   and the threshold test includes the failure probability exceeding a failure probability threshold;
 c) program code configured to determine whether each timing endpoint fails a threshold test;
 d) program code configured to prioritize any timing endpoints that fail the threshold test according to respective failure coefficients; and
 e) program code configured to modify the design to improve a slack of at least one of the timing endpoints.

12. The program product of claim 11, wherein the sensitivity determining code includes program code configured to:
 determine a first slack at each timing endpoint for a reference parameter value for each parameter;
 determine a second slack at each timing endpoint for a different parameter value than the reference parameter value for each parameter; and
 calculate the sensitivity of the slack to the variation in the at least one parameter.

13. The program product of claim 12, wherein the reference parameter value is substantially equivalent to one of:
 a first extreme value of a value range of the parameter; and
 a nominal value plus a multiple of a standard deviation of the parameter.

14. The program product of claim 12, wherein in the case that the first extreme value is used, the different parameter value is substantially equivalent to an opposite, second extreme value of the value range of the parameter.

15. The program product of claim 12, wherein the sensitivity calculating code includes program code configured to divide a difference between the first slack and the second slack by a difference between the reference parameter value and the different parameter value.

16. The program product of claim 11, wherein the worst case slack calculating code calculates the worst case slack by one of:
 determining a difference between a nominal slack and a multiple (Y) of a sum over all parameters of an absolute value of standard deviation; and
 determining a difference between a nominal slack and a multiple (Y) of a root sum square over all parameters of an absolute value of standard deviation.

17. The program product of claim 11, wherein in the case that the parameter distribution is non-Gaussian, the threshold test includes the worst-case slack of any timing endpoint exceeding a slack threshold, and
 the failure coefficient calculating code calculates a worst case slack excess for any timing endpoint exceeding the slack threshold.

18. The program product of claim 11, wherein the modifying code modifies the design by addressing the timing endpoints from a failure coefficient indicative of a highest probability of failure to a failure coefficient indicative of a lowest probability of failure.

19. The program product of claim 11, wherein the modifying code uses the sensitivity to parameter variations for a respective timing endpoint to guide parameter balancing and connectivity between paths that compose a timing test at the timing endpoint.

20. The program product of claim 11, wherein the modifying code provides a sufficient timing margin for a respective timing endpoint in order to account for sensitivities to parameter variations.

* * * * *